Figure 1:
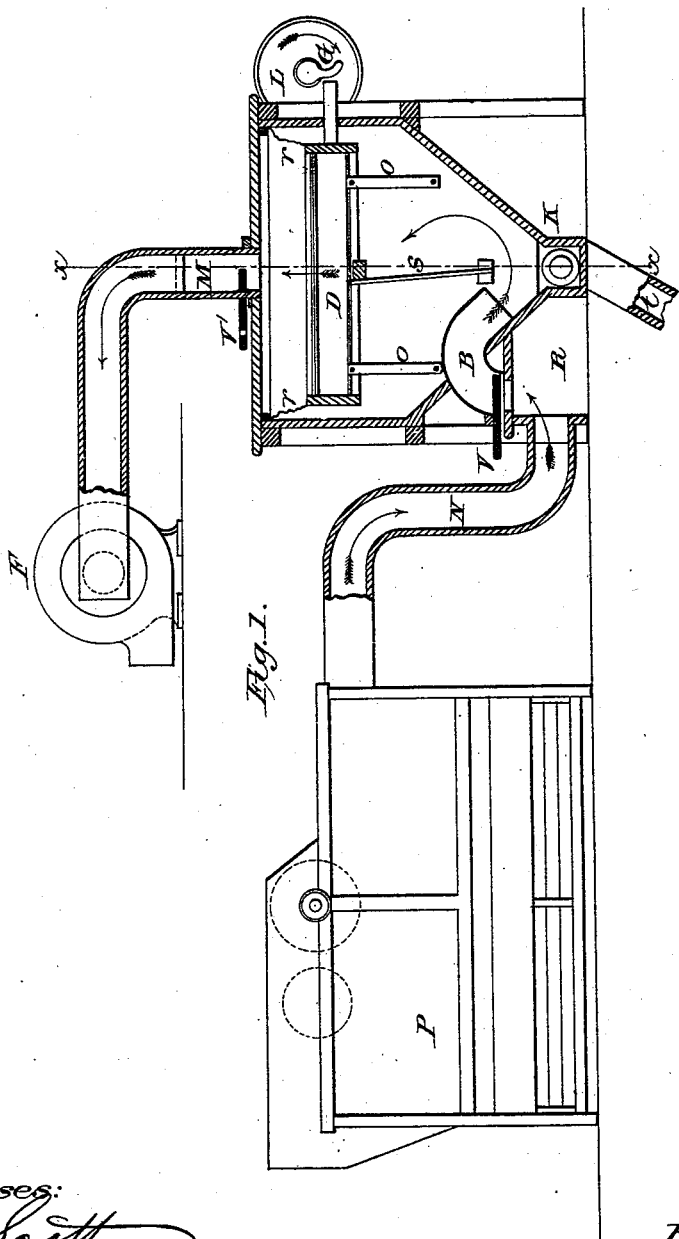

2 Sheets—Sheet 1.

C. C. WASHBURN.
Apparatus for Collecting Flour and other Dust from Flour Mills.

No. 213,151 — Patented Mar. 11, 1879.

Witnesses:
Alex Scott
W. M. Evans

Inventor:
C. C. Washburn

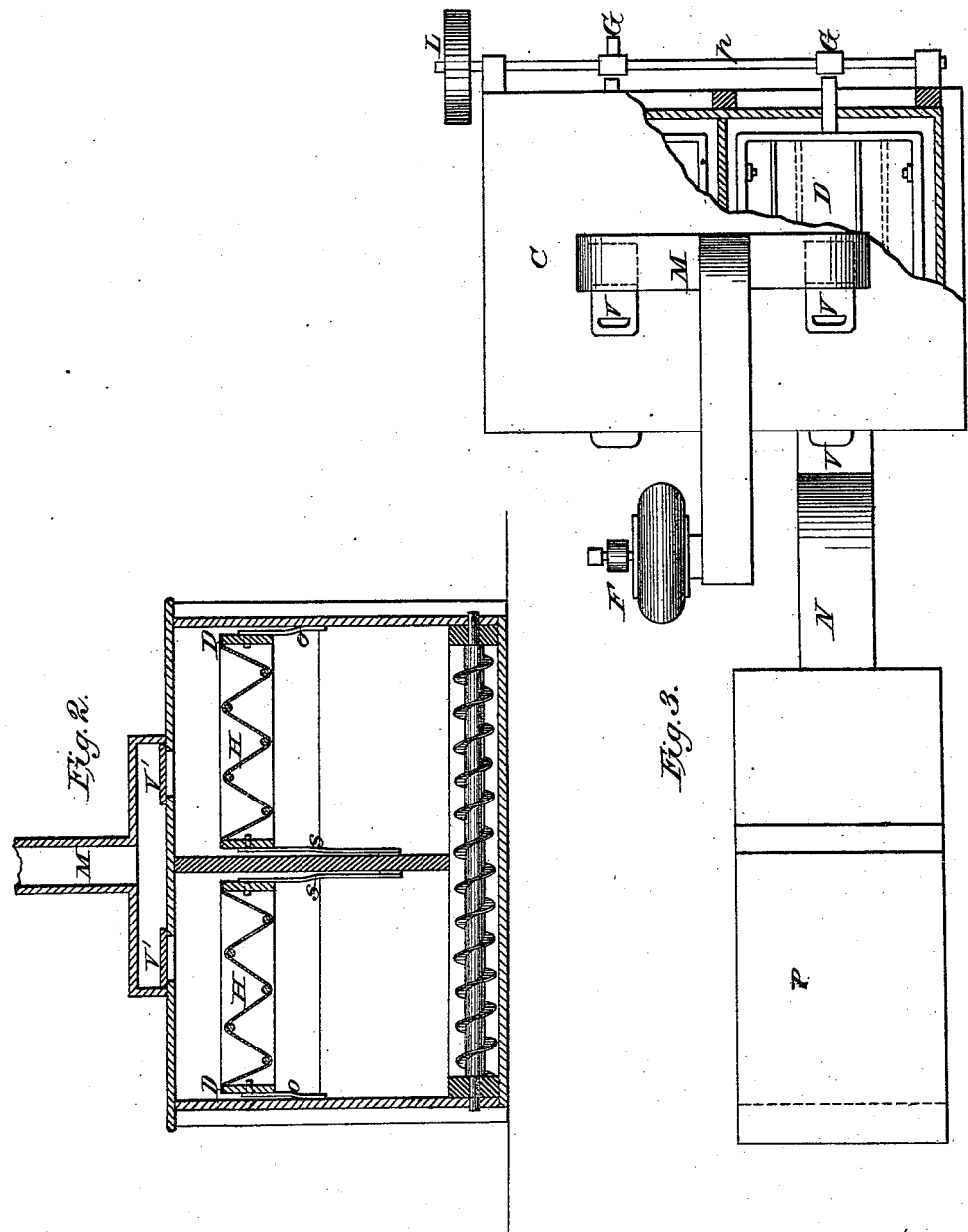

UNITED STATES PATENT OFFICE.

CADWALLADER C. WASHBURN, OF MADISON, WISCONSIN.

IMPROVEMENT IN APPARATUS FOR COLLECTING FLOUR AND OTHER DUST FROM FLOUR-MILLS.

Specification forming part of Letters Patent No. 213,151, dated March 11, 1879; application filed February 14, 1879.

*To all whom it may concern:*

Be it known that I, CADWALLADER C. WASHBURN, of Madison, Dane county, Wisconsin, have invented a new and useful Apparatus for Collecting and Removing Flour and other Dust from Flouring-Mills, of which the following is a specification:

Heretofore dust in flouring-mills has been a source of great danger from fire, and has been partially collected by being blown into a dust-room, where a part settled and was collected and saved, while the remainder was blown outside of the mill with the air and was lost. By this system mills remain very dusty and their operations hazardous, a large waste of material results, and, to replace the air constantly being blown out of mills, that from the outside is constantly rushing in, thus keeping a mill, despite all efforts to heat it, nearly at the same temperature as the atmosphere outside.

The object of my invention is to obtain and hold complete control of all dust as fast as created, and remove it to a place of safety. By its use all material is saved, and neither dust nor air is blown outside of the mill, the temperature of which can easily be maintained at any point desired, thus doing away with the usual condensation of steam and pasting of bolts, so common in most mills. By removing the dust, the cause of the majority of fires in flouring-mills is taken away.

The method used consists in drawing the air of the mill in which dust is mingled through a peculiar kind of woolen cloth made for the purpose. This is done by means of strong blast and exhaust fans. All dust in the air is arrested by the cloth, while the air, freed from dust, is returned whence it was taken. As a large part of the dust in mills at the present day comes from the so-called "new process" in milling and the use of middlings-purifiers, my invention is peculiarly adapted for use in connection with such machines, and the accompanying drawings show it in such connection.

Figure 1 is a sectional elevation, and Fig. 3 is a plan, partly sectional, of a purifier and the dust attachments embodying my invention. Fig. 2 is a longitudinal vertical sectional view of the dust-catcher frames D, showing two chambers or compartments.

Similar letters of reference indicate corresponding parts in the three figures.

My invention relates more particularly to the purification of middlings in flour-mills, in which, according to the present method, a large amount of fine flour-dust is blown outdoors and wasted. A large quantity of cold air from outside has to be admitted into the mill to provide the purifiers with the required amount of pure air necessary to clean the middlings.

While the particular embodiment of my invention herein shown is that of a dust-catcher, as used in connection with a middlings-purifier, it is capable of use in connection with a grinding-mill, or with an apartment of a mill-building, for freeing the air from dust; it removes the danger of explosion and fire arising from the presence of these fine particles suspended in the air; it saves valuable material which has hitherto been blown outside the mill and wasted; and it renders the interior of the mill warmer and healthier, by enabling the same air to be used repeatedly. The cold air entering the building is injurious to the health of the employés, and interferes with the bolting and other processes in the manufacture of flour, besides increasing the cost for fuel in heating the mills.

My apparatus consists of a main air-trunk, into which the purifiers discharge; a curved or straight spout, provided with a slide or valve; air-tight casings or chambers, tapering at the bottom to fit on a conveyer; a movable screen, through which the whole of the air blown into the chamber has to pass before escaping, the screen intercepting all particles of flour and dust which the air would otherwise carry away with it, and so constructed as to present a large surface; an opening and spout, provided with a slide or stop-valve on top of the chamber, leading to an exhaust-fan which discharges into the mill; and a mechanical device to rock or shake the said screen.

Referring to the drawings, P represents a middlings-purifier. N represents the blast-spout, leading into the main air-trunk R. V represents a slide on the curved spout B. C is the dust-chamber, inside of which is the movable dust-catcher frame or screen D, covered with a woolen fabric or cloth, so constructed as to present a large surface; and r represents pieces of this cloth fastened on the frame and tacked to the sides of the chamber, thereby making an absolutely dust-tight partition between the upper and lower parts of the chamber. o o are supports for the frame D, allowing a rocking motion of the same. G is a cam or eccentric, which, with the aid of the spring s, moves the frame backward and forward. V' is another slide in the exhaust-spout M, leading to the exhaust-fan F. K is a conveyer, discharging into the spout t. H represents the cloth, stretched across the frame in the manner shown.

The arrows on Fig. 1 indicate the course of the air drawn by the action of the exhaust-fan.

Any number of middlings-purifiers can discharge into a series of these chambers or compartments, provided there are one or two chambers in excess of the number of purifiers. Said chambers are shut out and the cloth is being cleaned by the combined action of the cam and the spring knocking the frame against a side of the chamber, thereby communicating a jar, and knocking off the dust which has settled on the cloth.

By the above-described arrangements, it will be seen that the air coming from the purifier through the spout N passes through the trunk R into an open compartment, where it is separated from the accompanying dust and impurities by the cloth screen D H, and passes out into the mill by the action of the fan F.

The slides V and V' are closed occasionally, to allow a thorough cleaning of the cloth. The dust falls into the conveyer K, where it is discharged through the spout t, and disposed of as thought most desirable.

What I claim as new, and desire to secure by Letters Patent, is—

1. The combination, with a middlings-separator and a fan or fans for producing air-currents through the same, of a mechanism, substantially as described, for intercepting the light impurities and fine flour carried off by the air-currents, and returning the purified air to the outside of the machine, substantially as set forth.

2. The herein-described dust-catching device, consisting of a chest divided into two or more compartments, connected by a common blast and a common exhaust-trunk, each chamber being provided with a slide or valve, to permit the shutting off of any compartment without disturbing the rest, substantially as set forth.

3. The combination of the blast and exhaust pipes, the chamber, the shaking frame, carrying the cloth H, and the slides for shutting off the air-currents, said slides being adapted to be operated independently of the devices for agitating the dust-catcher frames, substantially as set forth.

CADWALLADER C. WASHBURN.

Witnesses:
S. E. CARPENTER,
A. MOORE.